United States Patent [19]

Simoens

[11] Patent Number: 5,797,582
[45] Date of Patent: Aug. 25, 1998

[54] DISTRIBUTION DEVICE FOR FEEDING A CAPACITOR WITH GASEOUS FLUID

[76] Inventor: Herve Simoens, 40, avenue Foch, F-59100 Roubaix, France

[21] Appl. No.: 646,258
[22] PCT Filed: Nov. 10, 1994
[86] PCT No.: PCT/FR94/01318
   § 371 Date: Jul. 17, 1996
   § 102(e) Date: Jul. 17, 1996
[87] PCT Pub. No.: WO95/13973
   PCT Pub. Date: May 26, 1995

[30] Foreign Application Priority Data

Nov. 15, 1993 [FR] France ................ 93 13809

[51] Int. Cl.$^6$ .............................. F16K 31/12
[52] U.S. Cl. .............. 251/38; 4/354; 251/33; 137/624.13; 137/624.15
[58] Field of Search ............. 137/490, 491, 137/489.3, 624.13, 624.15; 251/38, 33; 4/354, 359, 361, 362

[56] References Cited

U.S. PATENT DOCUMENTS

| | | | |
|---|---|---|---|
| 2,426,065 | 8/1947 | Stevens et al. | 251/38 |
| 3,677,294 | 7/1972 | Gibbs et al. | 4/354 |
| 4,201,362 | 5/1980 | Nishimi et al. | |
| 4,233,698 | 11/1980 | Martin | 4/354 |
| 5,290,007 | 3/1994 | Lueues et al. | 251/38 |
| 5,435,019 | 7/1995 | Badders | 251/33 |

FOREIGN PATENT DOCUMENTS

| | | |
|---|---|---|
| 2660395 | 10/1991 | France . |
| 2737842 | 3/1979 | Germany . |

*Primary Examiner*—Denise L. Ferensic
*Assistant Examiner*—Joanne Y. Kim
*Attorney, Agent, or Firm*—Kerkam, Stowell, Kondracki & Clarke, P.C.; Edward J. Kondracki

[57] ABSTRACT

A dispensing device (1) for supplying a gaseous fluid (3) to a space (2) and abruptly emptying said space (2) to deliver its contents to an apparatus (4) once the supply has been cut off. The device (1) is characterized in that to reduce the fluid pressure in a supply chamber of the device and cause a sealing member to open abruptly once the supply of pressurized fluid (3) to the device (1) has been cut off, rather than discharging the pressurized fluid (3) in the supply chamber (5) to the atmosphere and that part of the supply circuit between said chamber (5) and the cut-off assembly, the pressurized fluid (3) which previously held the sealing member against a seal seat (10) is released into a discharge duct in the device.

21 Claims, 3 Drawing Sheets

DISTRIBUTION DEVICE FOR FEEDING A CAPACITOR WITH GASEOUS FLUID

BACKGROUND OF THE INVENTION

The invention concerns a method for controlling a distribution device ensuring in succession firstly the feeding of a capacitor with a compressed gaseous fluid, and secondly the abrupt discharging of this capacitor to an installation exploiting the compressed fluid.

The invention also concerns means to implement this control method and a device equipped with said means.

The invention is more particularly—but not restrictedly— applicable to improving the flow of granular or pulverulent substances at the outlets on installations, such as silos or hoppers.

DESCRIPTION OF RELATED ART

A distribution device of the type mentioned above is a device which, when fed with fluid under pressure, is interrupted by an appropriate device, and especially when the feed pressure is brought down to atmospheric pressure, it ensures the abrupt discharging of the capacitor with which it is operationally associated.

The document FR-A-2.660.395 describes such a device including a body having:

a variable volume feed chamber provided with firstly an orifice for feeding with the gaseous fluid compressed to said feed pressure, and secondly a passage for this gaseous fluid to the capacitor, and also a variable volume chamber for discharging towards the installation fitted with the device, said chamber being provided to this effect with a cut delimiting a passage channel for the fluid accumulated in the capacitor, said cut being bordered by a sealing seat for cooperating imperviously with the bearing surface of a sealing element having a specific weight, and secondly being connected to the installation by a pipe known as an evacuation pipe which starts from the seat.

The passage of the fluid to the capacitor is firstly extremely narrow so as to limit the risk of introducing pulverulent particles, and secondly is extended so that the total section of the passage is sufficient for quickly feeding the capacitor with fluid under pressure.

The sealing member is firstly mobile between two opposing positions, that is in one where it cooperates via its bearing surface with the seat of the evacuation pipe, and in another where it is widely distanced from the seat of said pipe, and secondly includes:

a first face which is exposed to the action of the fluid at the pressure when said fluid is directly located in the feed chamber, a second face which is opposite the first face and is exposed to the action of the fluid at the pressure when said fluid is located directly in the capacitor, a third face which is also opposite the first face and exposed to the action of the fluid at the pressure when said fluid is located in the evacuation pipe.

So that discharging is abrupt, this requires that not only must feeding be interrupted, but also that the feed chamber is abruptly emptied.

If the above does not occur, the air it contains and which could only be evacuated through said narrow passage would stop the backward movement of the piston.

As regards known embodiments, for this abrupt emptying of the feed chamber, this is effected by the control device when said chamber is connected to the atmosphere.

Known devices have the drawback of being noisy.

In fact, the sudden emptying of the feed chamber into the atmosphere causes a particularly powerful detonation.

SUMMARY OF THE INVENTION

One of the results the invention seeks to obtain is providing a device of the type mentioned above which, in relation to known devices, possesses a particularly attenuated sound transmission level.

Known devices have the drawback of having a low discharge speed.

Another of the results the invention seeks to obtain is to provide a device of the type mentioned above which, compared with known devices, possesses a significantly increased speed of passage from the feed state of the capacitor to its emptying state.

To this effect, the invention concerns a method for controlling a distribution device of the type mentioned above, wherein, so as to reduce the pressure in the fluid feed chamber and thus obtain the abrupt opening of the sealing member at approximately the end of interrupting the feeding with fluid under pressure of the distribution device, instead of emptying into the atmosphere the under pressure fluid contained in the feed chamber and a feed circuit portion between this chamber and the interruption device, the under pressure fluid, contained at least in the feed chamber and which until then would keep the seal in support on its sealing seat, is freed into said evacuation pipe.

The invention also concerns means to implement said method and the device equipped with said means.

BRIEF DESCRIPTION OF THE DRAWINGS

This invention shall be more readily understood from a reading of the following description given by way of non-restrictive example with reference to the accompanying drawing which diagrammatically represents.

DESCRIPTION OF THE PREFERRED EMBODIMENTS

With reference to the drawing, the latter shows a monostable distribution device 1 ensuring in succession firstly the feeding of a capacitor 2 (partially shown) with a compressed gaseous fluid 3 at the level of a source S at a feed pressure, and secondly the abrupt discharging of this capacitor 2 towards an installation (partly shown) exploiting the compressed fluid 3.

The fluid 3 is routed to a feed inlet E of the device by a pipe 3A.

A distribution device of the type mentioned above is understood to be a device which, when the under pressure fluid feeding is interrupted by a device M at its inlet E and the feed pressure is brought down to approximately atmospheric pressure, ensures the abrupt discharging of the capacitor with which it is operationally associated.

The compressed fluid has been represented by various arrows under the reference 3.

The device 1 includes a body 1A having:

a variable volume feed chamber 5 provided with firstly an orifice 6 for feeding with the gaseous fluid 3 compressed to said feed pressure, and secondly a passage 7 for passing this gaseous fluid 3 to the capacitor 2, and a variable volume chamber 8 for discharging to the installation fitted with the device 1, said chamber 8 being equipped to this effect with a cut 9 delimiting a passage channel for the fluid accumulated in the capacitor 2, said cut being bordered by a sealing seat 10 intended to cooperate imperviously with the bearing surface 11 of a sealing member 12 having a specific weight, and secondly at least being connected to the installation 4 by an evacuation pipe 13 which starts from the seat 10.

The passage 7 for carrying the fluid to the capacitor 2 is firstly extremely narrow so as to limit the risk of introducing pulverulent particles, and secondly is extended so that the total section of the passage is sufficient for quickly feeding the capacitor with fluid under pressure.

The sealing member is firstly mobile between two opposing positions, that is in one where it cooperates via its bearing surface 11 with the seat 10 of the evacuation pipe 13, and in another where it is widely distanced from the seat of said pipe, and secondly includes:

a first face 14 which is exposed to the action of the fluid 3 at the pressure when said fluid is directly located in the feed chamber 5, a second face 15 which is opposite the first face 14 and is exposed to the action of the fluid 3 at the pressure when said fluid is located directly in the capacitor 2, a third face 16 which is also opposite the first face 14 and exposed to the action of the fluid 3 at the pressure when said fluid is located in the evacuation pipe 13.

The dimension of the first face 14 of the sealing member 12 is conventionally approximately equal to the sum of the dimensions of its second and third faces 15 and 16.

Figure 1:
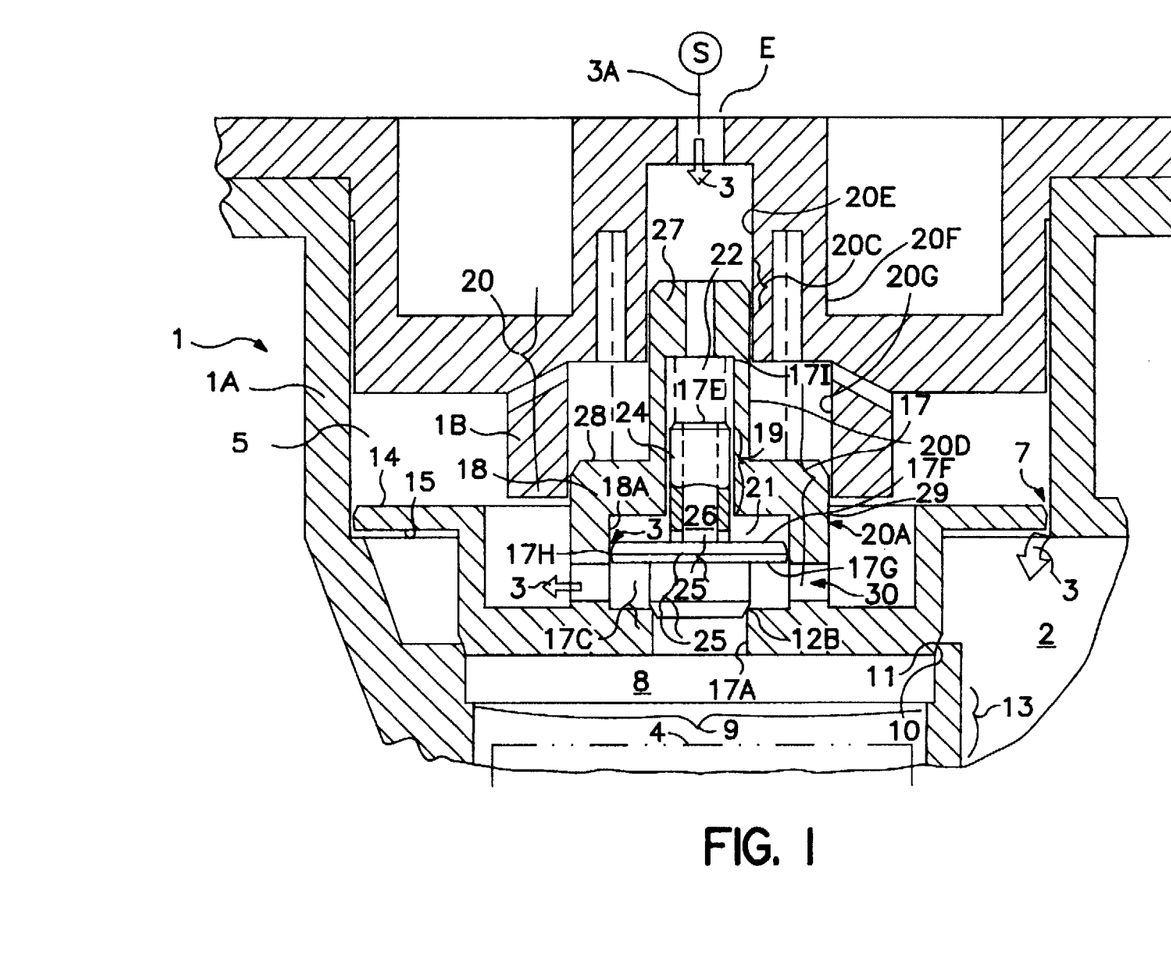
FIG. 1: a cutaway view of the device conforming to the invention seen along a longitudinal axis.
Figure 2:
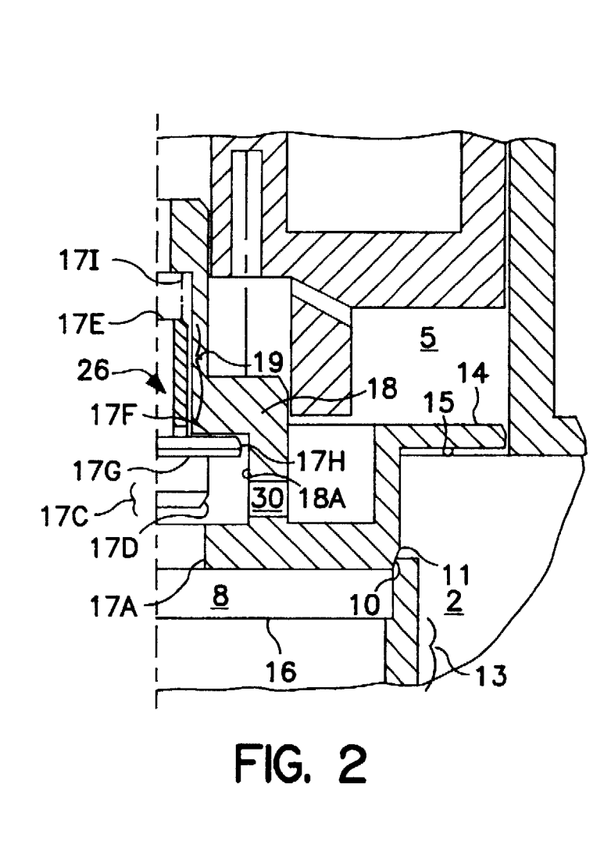
FIGS. 2 and 3: two half-views of the device of FIG. 1 in two successive operating phases.
Figure 3:
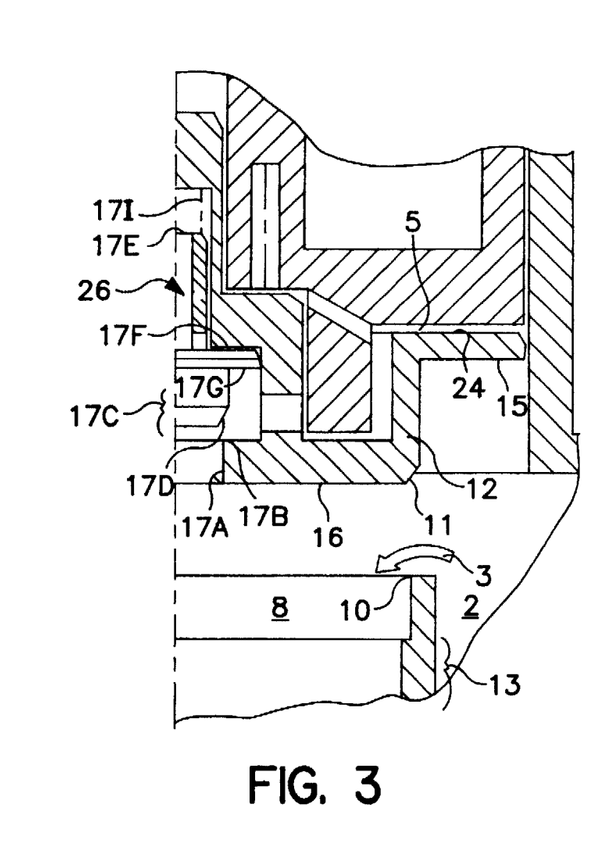
Figure 4:
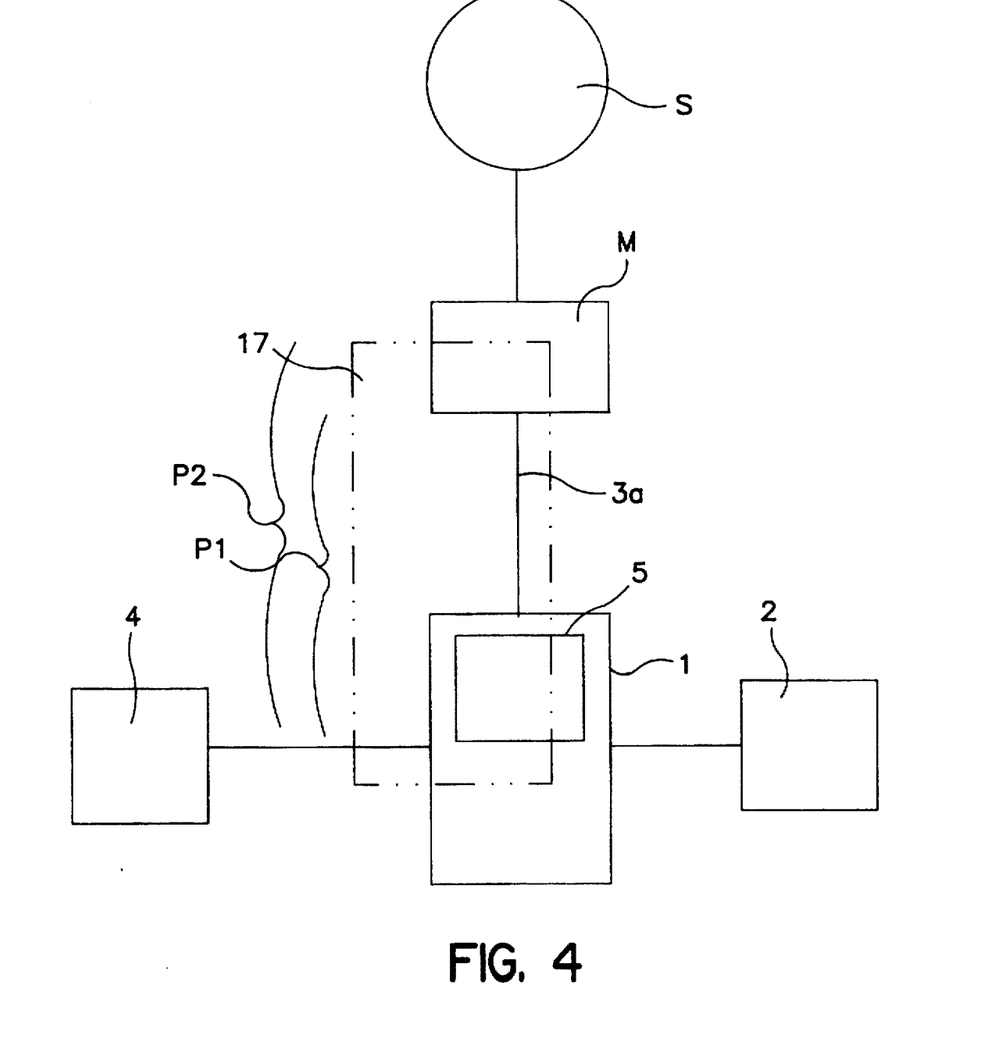
FIG. 4: a diagram for mounting the device.

Therefore, when feeding with fluid under pressure 3 is interrupted by a device M at the inlet E of the device 1 and in particular when the feed pressure is brought down to approximately atmospheric pressure, the first face 14 being freed from the action of the fluid 3 at its feed pressure:

the fluid 3 contained in the capacitor 2 acting on its second face 15 pushes back the sealing member 12 which ensures the abrupt discharging (FIG. 3) of the capacitor 2 through the discharge pipe 13 connected to the installation 4.

The fluid pressure, which would until then remain against the third face 16, was the pressure existing in the installation 4, such as the hopper, that is approximately a pressure equivalent to atmospheric pressure and thus to the pressure existing in the feed chamber when the fluid contained in said chamber has been effectively able to escape.

So as to reduce the pressure in the under pressure fluid feed chamber and thus obtain the abrupt opening of the sealing member 12 approximately at the end of interrupting feeding of the under pressure fluid 3 of the distribution device 1, instead of emptying into the atmosphere the under pressure fluid 3 contained in the feed chamber 5 and a feed circuit portion P1 between this chamber 5 and the interruption device M, the under pressure fluid 3, contained at least in the feed chamber 5 and which until then would keep the seal 12 in support on its sealing seat 10, is freed into said evacuation pipe 13.

Therefore, the abrupt holding of the under pressure fluid contained in the feed chamber 5 no longer directly generates any sound nuisance.

Apart from the under pressure fluid 3 contained in the feed chamber 5, the under pressure fluid 3 contained in a portion P2 of the feed circuit including the device M for interrupting said feeding and the portion of the feed pipe 3A inserted between this device M and said feed chamber 5 is also freed into the evacuation pipe 13.

The observance of these particular characteristics further attenuates the sound transmission of the distribution device of the invention.

The invention also concerns a device 17 to implement the method.

More specifically, this concerns at least one controlled device for freeing into the evacuation pipe 13 the under pressure fluid 3 contained at least in the feed chamber 5 so as to keep the sealing member 12 and its bearing surface 11 in support on its sealing seat 10.

This is preferably a controlled freeing device 17 which, apart from the evacuation the fluid 3 under pressure contained in the feed chamber 5, also frees into the evacuation pipe 13 the under pressure fluid 3 contained in one portion P2 of the feed circuit including the device M for interrupting said feeding and the feed pipe 3A inserted between said device M and said feed chamber 5.

In one preferred embodiment, this involves a freeing device 17 which, being sensitive to the feed pressure of the under pressure fluid 3, is able, when the value of the under pressure fluid 3 feed pressure is less than a predetermined value, to induce the abrupt application to the first face 14 of the sealing member 12 of the action of the gaseous fluid 3 at the pressure when said fluid is found in the evacuation pipe 13, that is at the pressure where it acts on the third face 16 of the sealing member 12.

The under pressure fluid contained in the feed chamber no longer has to be evacuated towards the interruption device M via the feed pipe 3A of this chamber.

One original aspect is that in fact the device M for abruptly interrupting feeding no longer needs to have a distributor able to:

firstly interrupt the flow of under pressure fluid derived from the source S, and secondly empty into the atmosphere the fluid from the feed chamber and from the feed pipe portion which connects it to the distributor.

Therefore, the reaction speed of the device is increased significantly since the equilibrium of the pressures exerted on the first and third faces of the seal 12 can be effected instantly.

The predetermined operation pressure value of the freeing device 17 is lower than the value of the nominal pressure for feeding the device 1 with under pressure fluid 3.

For example, the predetermined operating value is close to the atmospheric pressure value, but an operator can select this value according to the operating parameters of the installation 4.

In order to do this, the freeing device 17 comes into operation when feeding of the device 1 with fluid 3 under pressure is interrupted and especially when its feed inlet E is placed at atmospheric pressure by a suitable device (not shown).

The controlled abrupt freeing device 17 includes:

a cut 17A which, embodied in the sealing member 12, firstly determines a channel 17A opening into the first and third faces 14, 16 respectively of said sealing member 12, and secondly also constitute a seat 17B for sealing off the entire passage section of the channel 17A.

an element 17C for sealing the channel 17A which:

has a seal bearing surface 17D for cooperating with the seat 17B of this channel 17A, is mobile between two opposing positions, that is one in which it has its bearing surface 17D against the seat 17B of the channel 17A and the other in which said bearing surface 17D is spaced from said seat 17B, has at least two opposing surfaces 17E, 17F, 17G both subjected to the action of the gaseous fluid 3, but firstly one 17E, 17F directly at the pressure at which the fluid is introduced into the body 2, and secondly the other 17G at the pressure it takes by being located in said feed chamber 5.

has one surface 17H which, when orientated towards an antagonistic surface 18A integral with a separate wall 18 of the sealing element 17C embodies along with this antagonistic surface a passage 6 which firstly is sufficiently narrow to limit the risk of introducing pulverulent particles, and secondly is extended so that the whole passage section is sufficient for quickly feeding the feed chamber 5 and accordingly the capacitor 2 with fluid under pressure.

In this embodiment, the device 1 is particularly efficient.

The controlled freeing device 17 includes an elastic member 17I of the sealing element 17C applied via its bearing surface 17D against the sealing seat 17B.

The predetermined operating pressure value of the freeing device 17 is thus mainly determined by the stiffness of the elastic member 17I which stresses the sealing element 17C towards the sealing seat 17B.

The sealing element 17C is translation-mobile between its two opposing positions and cooperates, at least indirectly, with the body 1A of the device, at least via the bias of a translation guiding device 19 sealed from the gaseous fluid 3.

This latter characteristic optimises the functioning of the device.

The sealing member 12 is approximately generated by rotation and is translation-guided between its two opposing positions by a suitable device 20 which when situated approximately on the longitudinal axis of said member 12 is sealed from the gaseous fluid 3.

The guiding device 20 includes a rotating part 20A which has two opposing ends 20B, 20C, one end 20B being associated with the sealing member 12 and the other 20C having a cylindrical bearing surface 20D which cooperates with a translation-guiding bore 20E firstly reserved in a wall 1B linked at least indirectly to the body 1A of the device 1, and secondly connected at least indirectly to the source S of the under pressure fluid 3.

The sealing member 12 is elastically stressed by a suitable element 20F in the direction of application of its bearing surface 11 against the seat 19 of the evacuation pipe 13.

Notably:

the cut 17A constituting the channel 17A is embodied at approximately the centre of the sealing member 12, the rotating part 20A which the translation-guiding device 20 of the sealing member 12 includes has approximately coaxial to the cut 17A an approximately cylindrical rotating cavity 21 which opens at one of its ends into the feed chamber 5 and coaxially has at the other end a rotating cylindrical pipe 22 opening into the bore 20E of said translation-guiding device connected to the under-pressure fluid source S, the sealing element 17C of the channel 17A consists of a shouldered rotating body which includes:

a median shaft 23 which, known as a piston, is engaged in the cavity 21 of the rotating part 20A of the translation-guiding device 20 of the sealing member 12 so as to firstly have a cylindrical face 17H opposite the surface 18A of the cavity 21 so as to constitute a passage 6 having the characteristics of the feed passage 6 of the feed chamber 5 of the device, and secondly two extreme opposing surfaces 17F, 17G, one of them 17F being orientated towards the inside of the cavity 21 and thus directly exposed to the fluid 3 at its feed pressure, and the other 17G also being exposed to the fluid 3 but at the pressure the latter takes in the feed chamber 5, two opposing extreme cylindrical shafts 24, 25, one shaft 24, borne by the surface 17G receiving the action of the fluid 3 at the pressure it takes in the feed chamber 5, firstly having the sealing bearing surface 17D for cooperating with the seat 17B of the channel 17A, and secondly the other 24, borne by the surface 17F orientated towards the inside of the cavity 21, being engaged on sliding in the pipe 22 indirectly connected to the under pressure fluid source S and includes a perforation 26 approximately axial and open, not merely in the free face 17E of this shaft, but also at the level of its connection plane with the face 17F which bears it.

Notably, the pipe 22 indirectly connected to the under-pressure fluid source S is shouldered and shelters an elastic member 17I which, when resting on said shoulder and moreover on the free face 17E of the shaft 24 engaged in this pipe 22, ensures that the element 17C is applied via its bearing surface 17D against the sealing seat 17B of the channel 17A open in the sealing member 12.

Notably, the rotating part 20A which the translation-guiding device 20 of the sealing member 12 includes is a shouldered part which has:

a shaft 27 whose lateral surface 20D has a rotating cylinder and constitutes the bearing surface 20D intended to cooperate with the translation-guiding bearing surface 20E reserved in the wall 1B, at least indirectly, connected to the body 1A of the device 1, and a shouldered surface 28 to which said shaft 27 is connected, a cylindrical rotating surface coaxial to the shaft cooperates with a bearing surface 20G which, at least indirectly connected to the body 1A of the device 1, includes at least one orifice 30 authorising the passage of the fluid contained in the feed chamber to the shouldered surface 28 so as to be applied to said surface at the pressure when said fluid is located in the chamber 5.

The observance of the above characteristics makes it possible to produce a particularly strong and reliable device.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

I claim:

1. A distribution device (1) for ensuring in succession the feed pressure of a capacitor (2) with a compressed gaseous fluid (3) compressed at a source level (S) at said feed pressure, and, following an interruption of feeding by an interruption device (M), an abrupt discharge of said capacitor (2) to an installation (4) exploiting the compressed fluid (3), said compressed fluid (3) being routed to a feed inlet (E) of the distribution device (1) by a feed pipe (3A) in which the interruption device (M) is located, the distribution device (1) further comprising:

a body (1A) having a variable volume feed chamber (5), said chamber (5) having a feed orifice for feeding the gaseous fluid (3) compressed at said feed pressure, a passage (7) in said body (14) for passing said gaseous fluid (3) to the capacitor (2), and a variable volume discharge chamber (8) in said body (1A) for discharging to the installation (4), said chamber (8) having a cut (9) delimiting a passage channel for the fluid (3) accumulated in the capacitor (2), said cut being bordered by a sealing seat (10) adapted to cooperate imperviously with a bearing surface (11) of a sealing member (12) having a specific weight, and said chamber (8) being connected to the installation (4) by an evacuation pipe (13) extending from said sealing seat (10), the sealing member (12) being mobile between two opposing positions including a first position in which the sealing member cooperatively engages said bearing surface (11) with the seat (10) of the evacuation pipe (13), and in which the sealing member (12) is disengaged from the seat of said pipe; said sealing member (12) further including a first face (14) exposed to the action of the fluid (3) at the pressure when said fluid is in the feed chamber (5), a second face (15) opposite the first face (14) and exposed to the action of the fluid (3) at the pressure when said fluid is in the capacitor (2), and a third face (16) opposite the first face (15) and exposed to the action of the fluid (3) at the pressure when said fluid is located in the evacuation pipe (13), wherein, so as to reduce the pressure in the fluid feed chamber and thus obtain the abrupt opening of the sealing member (12) approximately at the end of interrupting the feeding with fluid (3) under pressure of the distribution device (1), instead of emptying into the atmosphere, the pressurized fluid (3) contained in the feed chamber (5) and a feed circuit portion (P1) between the feed chamber (5) and the interruption device (M), the pressurized fluid (3), contained at least in the feed chamber (5) and which until then would keep the seal (12) in support on a sealing seat (10), is freed into said evacuation pipe (13).

2. A distribution device according to claim 1, constructed and arranged such that, apart from the pressurized fluid (3) contained in the feed chamber (5), the pressurized fluid (3) contained in a portion (P2) of the feed circuit (P1) is also freed into the evacuation pipe (13), said feed circuit including said interruption device (M) and the portion of the feed pipe (3A) disposed between said interruption device (M) and said feed chamber (5).

3. A distribution device according to claim 1, further including at least one controlled device for freeing into the evacuation pipe (13) the pressurized fluid (3) contained at least in the feed chamber (5) so as to keep the sealing member in support on said sealing seat (10).

4. A distribution device according to claim 2 further including at least one controlled device for freeing into the evacuation pipe (13) the pressurized fluid (3) contained at least in the feed chamber (5) so as to keep the sealing member in support on said sealing seat (10).

5. A distribution device according to claim 3 further including a controlled freeing device (17) which, apart from the evacuation of the pressurized fluid (3) contained in the feed chamber (5), also is disposed to free into the evacuation pipe (13) the pressurized fluid (3) contained in a portion (P2) of the feed circuit including the interruption device (M) for interrupting said feeding and the feed pipe (3A) disposed between said interruption device (M) and said feed chamber (5).

6. A distribution device according to claim 4 further including a controlled freeing device (17) which, apart from the evacuation of the under pressure fluid (3) contained in the feed chamber (5), also is disposed to free into the evacuation pipe (13) the pressurized fluid (3) contained in a portion (P2) of the feed circuit including the interruption device (M) for interrupting said feeding and the feed pipe (3A) inserted between said interruption device (M) and said feed chamber (5).

7. A distribution device according to claim 3, wherein the controlled freeing device (17) includes:

a cut in the sealing member (12) determining a channel (17A) opening into the said first (14) and third (16) faces of said sealing member (12), and constituting a seat (17B) for sealing off an entire passage section of said channel (17A), an element (17C) for sealing off the channel having a sealing bearing surface (17D) cooperating with a seat (17B) of said channel (17A), said element (17C) being lighter in weight relative to the weight of the sealing member (12), and being mobile between two opposing positions, one position in which said bearing surface (17D) is positioned against the seat (17B) of the channel (17A) and another position in which said bearing surface (17D) is spaced from said seat (17B), said element further including at least two opposing surfaces (17E, 17F, 17G) subjected to the action of the gaseous fluid (3), one opposing surface (17E, 17F) being subjected directly to the pressure at which the fluid is introduced into the body (2) and another opposing surface (17G) being subjected to the pressure of said feed chamber (5), and a surface (17H) orientated towards an antagonistic surface (18A) integral with a part (18) separate from the sealing element (17C) forming with said antagonistic surface (18A) a passage (6), said passage being sufficiently narrow to limit the introduction of pulverulent particles, and extending so that the total passage is sufficient for rapidly feeding the feed chamber (5) and the capacitor (2) with fluid under pressure.

8. A distribution device according to claim 4, wherein the controlled freeing device (17) includes:

a cut in the sealing member (12) determining a channel (17A), opening into the said first (14) and third (16) faces of said sealing member (12), and constituting a seat (17B) for sealing off an entire passage section of the channel (17A), an element (17C) for sealing off the channel having a sealing bearing surface (17D) cooperating with a seat (17B) of said channel (17A), said element (17C) being lighter in weight relative to the weight of the sealing member (12), and being mobile between two opposing positions, one position in which said bearing surface (17D) is positioned against the seat (17B) of the channel (17A) and another position in which said bearing surface (17D) is spaced from said seat (17B), said element further including at least two opposing surfaces (17E, 17F, 17G) subjected to the action of the gaseous fluid (3), one opposing surface (17E, 17F) being subjected directly to the pressure at which the fluid is introduced into the body (2) and another opposing surface (17G) being subjected to the pressure of said feed chamber (5), and a surface (17H) orientated towards an antagonistic surface (18A) integral with a part (18) separate from the sealing element (17C) forming with said antagonistic surface (18A) a passage (6), said passage being sufficiently narrow to limit the introduction of pulverulent particles, and extending so that the total passage is sufficient for rapidly feeding the feed chamber (5) and the capacitor (2) with fluid under pressure.

9. A distribution device according to claim 5, wherein the controlled freeing device (17) includes:

a cut in the sealing member (12) determining a channel (17A) opening into the said first (14) and third (16) faces of said sealing member (12), and constituting a seat (17B) for sealing off an entire passage section of the channel (17A), an element (17C) for sealing off the channel having a sealing bearing surface (17D) cooperating with a seat (17B) of said channel (17A), said element (17C) being lighter in weight relative to the weight of the sealing member (12), and being mobile between two opposing positions, one position in which said bearing surface (17D) is positioned against the seat (17B) of the channel (17A) and another position in which said bearing surface (17D) is spaced from said seat (17B), said element further including at least two opposing surfaces (17E, 17F, 17G) subjected to the action of the gaseous fluid (3), one opposing surface (17E, 17F) being subjected directly to the pressure at which the fluid is introduced into the body (2) and another opposing surface (17G) being subjected to the pressure of said feed chamber (5), and a surface (17H) orientated towards an antagonistic surface (18A) integral with a part (18) separate from the sealing element (17C) forming with said antagonistic surface (18A) a passage (6), said passage being sufficiently narrow to limit the introduction of pulverulent particles, and extending so that the total passage is sufficient for rapidly feeding the feed chamber (5) and the capacitor (2) with fluid under pressure.

10. A distribution device according to claim 6, wherein the controlled freeing device (17) includes:

a cut in the sealing member (12) determining a channel (17A) opening into the said first (14) and third (16) faces of said sealing member (12), and constituting a seat (17B) for sealing off an entire passage of the channel (17A), an element (17C) for sealing off the channel having a sealing bearing surface (17D) cooperating with a seat (17B) of said channel (17A), said element (17C) being lighter in weight relative to the weight of the sealing member (12), and being mobile between two opposing positions, one position in which said bearing surface (17D) is positioned against the seat (17B) of the channel (17A) and another position in which said bearing surface (17D) is spaced from said seat (17B), said element further including at least two opposing surfaces (17E, 17F, 17G) subjected to the action of the gaseous fluid (3), one opposing surface (17E, 17F) being subjected directly to the pressure at which the fluid is introduced into the body (2) and another opposing surface (17G) being subjected to the pressure of said feed chamber (5), and a surface (17H) orientated towards an antagonistic surface (18A) integral with a part (18) separate from the sealing element (17C) forming with said antagonistic surface (18A) a passage (6), said passage being sufficiently narrow to limit the introduction of pulverulent particles, and extending so that the total passage is sufficient for rapidly feeding the feed chamber (5) and the capacitor (2) with fluid under pressure.

11. A distribution device according to claim 7 wherein the sealing member (12) is approximately generated by rotation and includes means (20) for translation-guiding the sealing member (12) between its two opposing positions, said guiding means (20) situated approximately on the longitudinal axis of said member (12) and sealed from the gaseous fluid, said guiding means (20) including a rotating part (20A) having two opposing ends (20B, 20C), one end (20B) being associated with the sealing member (12) and another end (20C) having a cylindrical bearing surface (20D) cooperating with a translation-guiding bore in a wall (18) linked at least indirectly to the body (1A) of the device (1), and connected at least indirectly to the source (S) of the under pressure fluid (3), wherein:

the cut constituting the channel (17A) is embodied approximately at the center of the sealing member (12), the rotating part (20A) which the translation-guiding device (20) of the sealing member (12) includes, approximately coaxial to the cut (17A), an approximately cylindrical rotating cavity (21) which at one end opens into the feed chamber (5) and at another end coaxially includes a cylindrical pipe (22), said pipe (22) opening into a bore (20E) of said translation-guiding device which is connected to the under pressure fluid source (S), the element (17C) for sealing off the channel (17A) having a shouldered cylindrical rotating body which includes:

a median piston shaft (23) engaged in the cavity (21) of the rotating part (20A) of the translation-guiding device (20) of the sealing element (12) so as to have cylindrical face (17H) opposite the surface (18A) of the cavity (21) to constitute a passage (6) having the characteristics of the feed passage (6) of the feed chamber (5) of the device, and two extreme opposing surfaces (17F, 17G), one surface (17F) being oriented towards the inside of the cavity (21) and being directly exposed to the fluid (3) at feed pressure, and the other surface (17G) being exposed to the fluid (3), at the pressure the fluid takes in said feed chamber (5), two extreme opposing cylindrical shafts (24, 25), one shaft (25) being borne by the surface (17G) receiving the action of the fluid (3) at the pressure thereof in the feed chamber (5), and having the sealing bearing surface (17D) adapted to cooperate with the seat (17B) of the channel (17A), and the other shaft (24) being borne by the surface (17F) oriented towards the inside of the cavity (21), and being slidingly engaged in the pipe (22) and indirectly connected to the under pressure fluid source (S) and including a perforation (26) approximately axial and open, in the free face (17E) of said shaft and, at the level of its connection plane, with the face of surface (17F).

12. A distribution device according to claim 8 wherein the sealing member (12) is approximately generated by rotation and includes means (20) for translation-guiding the sealing member (12) between its two opposing positions, said guiding means (20) situated approximately on the longitudinal axis of said member (12) and sealed from the gaseous fluid, said guiding means (20) including a rotating part (20A) having two opposing ends (20B, 20C), one end (20B) being associated with the sealing member (12) and the other end (20C) having a cylindrical bearing surface (20D) cooperating with a translation-guiding bore in a wall (18) linked at least indirectly to the body (1A) of the device (1), and connected at least indirectly to the source (S) of the under pressure fluid (3), wherein:

the cut constituting the channel (17A) is embodied approximately at the center of the sealing member (12), the rotating part (20A) which the translation-guiding device (20) of the sealing member (12) includes, approximately coaxial to the cut (17A), an approximately cylindrical rotating cavity (21) which at one end opens into the feed chamber (5) and at another end coaxially includes a cylindrical pipe (22), said pipe (22) opening into a bore (20E) of said translation-guiding device which is connected to the under pressure fluid source (S), the element (17C) for sealing off the channel (17A) having a shouldered cylindrical rotating body which includes:

a piston shaft (23) engaged in the cavity (21) of the rotating part (20A) of the translation-guiding device (20) of the sealing element (12) so as to have a cylindrical face (17H) opposite the surface (18A) of the cavity (21) to constitute a passage (6) having the characteristics of the feed passage (6) of the feed chamber (5) of the device, and two extreme opposing surfaces (17F, 17G), one surface (17F) being oriented towards the inside of the cavity (21) and being directly exposed to the fluid (3) at feed pressure, and the other surface (17G) being exposed to the fluid (3), at the pressure the fluid takes in said feed chamber (5), two extreme opposing cylindrical shafts (24, 25), one shaft (25) being borne by the surface (17G) receiving the action of the fluid (3) at the pressure thereof in the feed chamber (5), and having the sealing bearing surface (17D) adapted to cooperate with the seat (17B) of the channel (17A), and the other shaft (24) being borne by the surface (17F) oriented towards the inside of the cavity (21), and being slidingly engaged in the pipe (22) and indirectly connected to the under pressure fluid source (S) and including a perforation (26) approximately axial and open, in the free face (17E) of said shaft and, at the level of its connection plane, with the face of surface (17F).

13. A distribution device according to claim 9 wherein the sealing member (12) is approximately generated by rotation and includes means (20) for translation-guiding the sealing member (12) between its two opposing positions, said guiding means (20) situated approximately on the longitudinal axis of said member (12) and sealed from the gaseous fluid, said guiding means (20) including a rotating part (20A) having two opposing ends (20B, 20C), one end (20B) being associated with the sealing member (12) and the other end (20C) having a cylindrical bearing surface (20D) cooperating with a translation-guiding bore in a wall (18) linked at least indirectly to the body (1A) of the device (1), and connected at least indirectly to the source (S) of the under pressure fluid (3), wherein:

the cut constituting the channel (17A) is embodied approximately at the center of the sealing member (12), the rotating part (20A) which the translation-guiding device (20) of the sealing member (12) includes, approximately coaxial to the cut (17A), an approximately cylindrical rotating cavity (21) which at one end opens into the feed chamber (5) and at another end coaxially includes a cylindrical pipe (22), said pipe (22) opening into a bore (20E) of said translation-guiding device which is connected to the under pressure fluid source (S), the element (17C) for sealing off the channel (17A) having a shouldered cylindrical rotating body which includes:

a median piston shaft (23) engaged in the cavity (21) of the rotating part (20A) of the translation-guiding device (20) of the sealing element (12) so as to have a cylindrical face (17H) opposite the surface (18A) of the cavity (21) to constitute a passage (6) having the characteristics of the feed passage (6) of the feed chamber (5) of the device, and two extreme opposing surfaces (17F, 17G), one surface (17F) being oriented towards the inside of the cavity (21) and being directly exposed to the fluid (3) at feed pressure, and the other surface (17G) being exposed to the fluid (3), at the pressure the fluid takes in said feed chamber (5), two extreme opposing cylindrical shafts (24, 25), one shaft (25) being borne by the surface (17G) receiving the action of the fluid (3) at the pressure thereof in the feed chamber (5), and having the sealing bearing surface (17D) adapted to cooperate with the seat (17B) of the channel (17A), and the other shaft (24) being borne by the surface (17F) oriented towards the inside of the cavity (21), and being slidingly engaged in the pipe (22) and indirectly connected to the under pressure fluid source (S) and including a perforation (26) approximately axial and open, in the free face (17E) of said shaft and, at the level of its connection plane, with the face of surface (17F).

14. A distribution device according to claim 10 wherein the sealing member (12) is approximately generated by rotation and includes means (20) for translation-guiding the sealing member (12) between its two opposing positions, said guiding means (20) situated approximately on the longitudinal axis of said member (12) and sealed from the gaseous fluid, said guiding means (20) including a rotating part (20A) having two opposing ends (20B, 20C), one end (20B) being associated with the sealing member (12) and the other end (20C) having a cylindrical bearing surface (20D) cooperating with a translation-guiding bore in a wall (18) linked at least indirectly to the body (1A) of the device (1), and connected at least indirectly to the source (S) of the under pressure fluid (3), wherein:

the cut constituting the channel (17A) is embodied approximately at the center of the sealing member (12), the rotating part (20A) which the translation-guiding device (20) of the sealing member (12) includes approximately coaxial to the cut (17A), an approximately cylindrical rotating cavity (21) which at one end opens into the feed chamber (5) and at another end coaxially includes a cylindrical pipe (22), said pipe (22) opening into a bore (20E) of said translation-guiding device which is connected to the under pressure fluid source (S), the element (17C) for sealing off the channel (17A) having a shouldered cylindrical rotating body which includes:

a median piston shaft (23) engaged in the cavity (21) of the rotating part (20A) of the translation-guiding device (20) of the sealing element (12) so as to have a cylindrical face (17H) opposite the surface (18A) of the cavity (21) to constitute a passage (6) having the characteristics of the feed passage (6) of the feed chamber (5) of the device, and two extreme opposing surfaces (17F, 17G), one surface (17F) being oriented towards the inside of the cavity (21) and being directly exposed to the fluid (3) at feed pressure, and the other surface (17G) being exposed to the fluid (3), at the pressure the fluid takes in said feed chamber (5), two extreme opposing cylindrical shafts (24, 25), one shaft (25) being borne by the surface (17G) receiving the action of the fluid (3) at the pressure thereof in the feed chamber (5), and having the sealing bearing surface (17D) adapted to cooperate with the seat (17B) of the channel (17A), and the other shaft (24) being borne by the surface (17F) oriented towards the inside of the cavity (21), and being slidingly engaged in the pipe (22) and indirectly connected to the under pressure fluid source (S) and including a perforation (26) approximately axial and open, in the free face (17E) of said shaft and, at the level of its connection plane, with the face of surface (17F).

15. A distribution device according to claim 1, wherein the revolution part (20A), which the translation-guiding device (20) of the sealing member (12) includes, is a shouldered part having:

- a shaft (27) having a cylindrical lateral surface (20D) generated by rotation and constitutes a bearing surface (20D) for cooperating with a translation guiding bearing surface (20E) reserved in a wall (1B), at least indirectly connected to the body (1A) of the device (1), and

- a shouldered surface (28) to which said shaft (27) is connected,

- a cylindrical rotating surface (29) which coaxial to the shaft (27) cooperates with a bearing surface (20G) connected at least indirectly to the body (1A) of the device (1) and having at least one orifice (30) for the passage of fluid contained in the feed chamber (5) towards the shouldered surface (28) for said fluid to be applied to said surface at the pressure at which said fluid has in the chamber (5).

16. A distribution device according to claim 1 wherein the pipe (22) is indirectly connected to the under pressure fluid source (S) and is shouldered and shelters an elastic element (17I) which, when resting on said shoulder and also on a free face (17E) of the shaft (24) is engaged in said pipe (22) to ensure that the element (17C) is applied elastically via its bearing surface (17D) against the sealing seat (17B) of the channel (17A) open in the sealing element (12).

17. A distribution device according to claim 15, wherein the pipe (22) is indirectly connected to the under pressure fluid source (S) and is shouldered and shelters an elastic element (17I) which, when resting on said shoulder and also on a free face (17E) of the shaft (24) is engaged in said pipe (22) to ensure that the element (17C) is applied elastically via its bearing surface (17D) against the sealing seat (17B) of the channel (17A) open in the sealing element (12).

18. A distribution device according to claim 7 wherein the controlled freeing device (17) includes an elastic application element (17I) of the sealing element (17C) being applied via a bearing surface (17D) thereof against the sealing seat (17B).

19. A distribution device according to claim 11 wherein the controlled freeing device (17) includes an elastic application element (17I) of the sealing element (17C) being applied via a bearing surface (17D) thereof against the sealing seat (17B).

20. A distribution device according to claim 15 wherein the controlled freeing device (17) includes an elastic application element (17I) of the sealing element (17C) being applied via a bearing surface (17D) thereof against the sealing seat (17B).

21. A distribution device according to claim 16 wherein the controlled freeing device (17) includes an elastic application element (17I) of the sealing element (17C) being applied via a bearing surface (17D) thereof against the sealing seat (17B).

* * * * *